United States Patent [19]

Huang

[11] Patent Number: 5,303,668
[45] Date of Patent: Apr. 19, 1994

[54] SELF-STABLE, PORTABLE, FOLDABLE, EASILY ASSEMBLED ROAD WARNING SIGNAL

[76] Inventor: Andrew B. Huang, 28442 Lomo Dr., Rancho Palos Verdes, Calif. 90274

[21] Appl. No.: 24,744

[22] Filed: Mar. 2, 1993

[51] Int. Cl.⁵ .......................... G09F 13/16; B60Q 7/00
[52] U.S. Cl. ................. 116/63 P; 116/63 T; 40/539; 40/602; 40/612; 40/903
[58] Field of Search ............... 116/63 P, 63 C, 63 T, 116/209; 40/539, 602, 612, 903

[56] References Cited

U.S. PATENT DOCUMENTS

| 2,074,420 | 3/1937 | Otis | 40/539 |
| 2,835,219 | 5/1958 | Back | 116/63 P |

FOREIGN PATENT DOCUMENTS

| 0879816 | 6/1953 | Fed. Rep. of Germany | 116/63 P |
| 0724361 | 2/1955 | United Kingdom | 116/63 P |
| 1362523 | 8/1974 | United Kingdom | 116/63 P |
| 2049767 | 12/1980 | United Kingdom | 116/63 C |
| 8704672 | 8/1987 | World Int. Prop. O. | 116/63 T |

*Primary Examiner*—William A. Cuchlinski, Jr.
*Assistant Examiner*—Willie Morris Worth

[57] ABSTRACT

A self-stable, light weight, foldable and easily assembled road signaling device for disabled vehicle warning or the temporary channeling of traffic, comprising of a flexible warning panel and base. The polygonal panel and complimentary base are formed from the cut lines on an unitary flat sheet body. When the warning panel is folded upright, the base is formed from the remaining unit. Alternatively, the signaling device comprises of a flexible panel affixed to a flat light weight base. The panel is coated with fluorescent or reflective material. Shaped to reduce air drag and constructed of flexible material, in wind or turbulence, the whole warning panel will sway about the stationary base.

6 Claims, 2 Drawing Sheets

SELF-STABLE, PORTABLE, FOLDABLE, EASILY ASSEMBLED ROAD WARNING SIGNAL

BACKGROUND

1. Field of Invention

This invention relates to a self-stable, light weight, foldable and easily assembled signaling device for disabled vehicle warning or temporary traffic channeling.

2. Discussion of Prior Arts

Numerous road hazard and traffic channeling devices are currently available. For disabled motorists, the most common warning signals are chemical flares and reflector triangles. Signs, flags and cones are most frequently used by road repair crews and policemen for the temporary channeling of traffic.

Flares have been employed since the advent of the automobile. When ignited and placed on the road surface, a bright flame is produced that warns oncoming traffic of accidents. Although highly visible when ignited, there are many drawbacks in using them. They will only burn for 15 to 30 minutes. Therefore, a large number must be stored for emergencies. Flares may become chemically inactive after a few years. Many motorists hesitate to store or handle them because of their extreme flammability. The spent flares littering the highways and the thick smoke from burning flares present environmental problems.

Emergency reflector triangles are also frequently used by disabled motorists. The triangles are made of three reflector arms attached to a weighted base. When the arms are assembled, a triangular shaped reflector is formed. There are also numerous drawbacks in their use. Reflector triangles are unwieldy because of the heavy base. As designed, the heavy base is required to ensure that the triangle is not toppled over by gusts of wind or traffic generated turbulence. They need to be assembled, which is a problem for the non-mechanical inclined. Lastly, although general collapsible, they require storage in the trunks of vehicles.

Signs, flags and cones are mostly used for the temporary directing of traffic, especially by road maintenance crews. Except for cones, all of these devices need to be assembled. They all utilize a heavy base to prevent toppling by wind or traffic generated turbulence. They are all bulky because of their rigid construction or base. Their application are limited due to their designed size and weight.

Numerous alternative devises for disabled vehicle warning and traffic channeling devices have been proposed to solve the above said problems of size and weight. In reference to U.S. Pat. Ser. Nos. 2,991,699; 2,869,504 and 2,881,662 rigid triangular signaling devices made from an unitary body member are described. The unitary body consisting of semi-rigid material, which when folded forms a base, sign and support structure. The members are locked together to form a rigid triangular sign. In reference to U.S. Pat. Ser. No. 4,466,376 and 4,789,747 pre-cut unit member sheets are folded to form the sides and bottom of pyramidal structures. Although portable and easily stored, precisely due to their light weight and rigid structures when assembled, all of these signals are unable to stand by themselves. A gust of wind or turbulence from a passing vehicle will topple them unless they are weighted down by stones, sand or a hand tool placed on the base.

None of the references teach the new and novel elements in the environment set forth hereinafter and defined as a self-stable, light weight, foldable and easily assembled warning device. Neither do they provide all the benefits and advantages associated therewith the following proposed embodiments. Whereas the previous inventions all have limited application, as will become obvious from the figures and detailed description below, the proposed invention has broader application. The hereinafter embodiments will demonstrate the self-stable but light weight, easily stored and easily assembled features of said road hazard warning or channeling device.

SUMMARY OF THE INVENTION

Briefly stated, the present invention involves a self-stable, light weight, foldable and easily assembled road signaling device for disabled vehicle warning or the temporary channeling of traffic, comprising of a bendable and flexible warning panel and flat base. The warning panel and the complimentary base are constructed from the cut line segments on an unitary, flat, bendable, relatively light weight, sheet material. The cut line segments and an upright fold line segment form the sides of an enclosed polygon, which serves as the warning panel. When the polygonal panel member is folded upright, a base is formed from the remaining unit. Alternatively, the warning device comprises of a bendable, flexible, relatively light weight, panel affixed to a flat base. The warning panel is coated with luminescent, reflective materials or attached with other highly visible emitters. Shaped to reduce air drag and constructed to be flexible, the whole panel will undulate in the wind or in the traffic generated turbulent flow field. With increases in traffic turbulence, the warning panel will sway faster with respect to the stationary base. This warning panel motion will provide even greater noticeability for the oncoming traffic. The base is wider and longer than the warning panel dimensions, thus providing a low center of gravity to the signaling device. The base is flat which prevents air flow from overturning the warning signal from the underside. After use, the warning panel is folded back into the flat position for storage.

OBJECTS AND ADVANTAGES

Accordingly, besides the objects and advantages of the self-stable, light weight, foldable and easily assembled road signaling device disclosed in my patent, several objects and advantages of the present invention are:

a) to provide a disabled vehicle warning sign, light enough, foldable and flat enough to be stored in the glove compartment or trunk of most cars, buses and trucks;

b) to provide a cone, sign or flag substitute, light enough, foldable and flat enough to be stored in the trunks of police cars, and road repair crew's trucks, to be used in channeling traffic;

c) to provide an environmentally safe flare alternative;

d) to provide a warning device that is easily manufactured from bendable, flexible materials, such as sheet metals, plastics, cardboard, plywood.

These and other object advantages and novel features of the invention will become apparent from the detailed description which follows, when considered in conjunction with the accompanying drawings.

REFERENCE NUMERALS IN DRAWINGS

| | |
|---|---|
| 30 | unitary sheet |
| 31 | cut line segments |
| 32 | warning panel |
| 33 | cut-out |
| 34 | upright fold line |
| 35 | base |
| 36 | unfold line |
| 37 | fastener |

DESCRIPTION OF INVENTION

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

Figure 1:
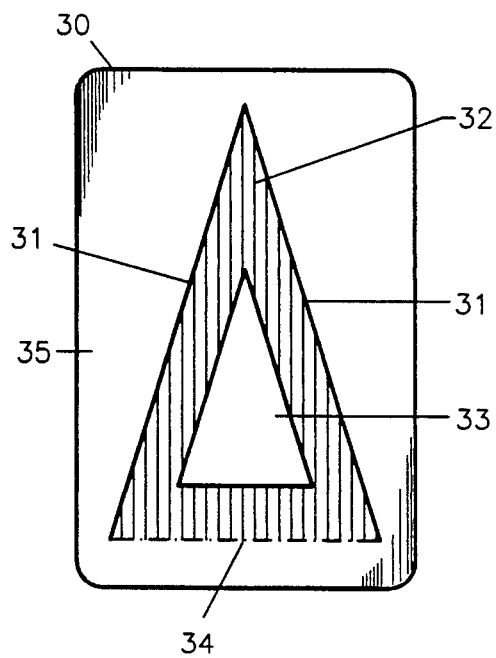
FIG. 1 is the top view of the preferred unitary body member embodiment.
Figure 2:
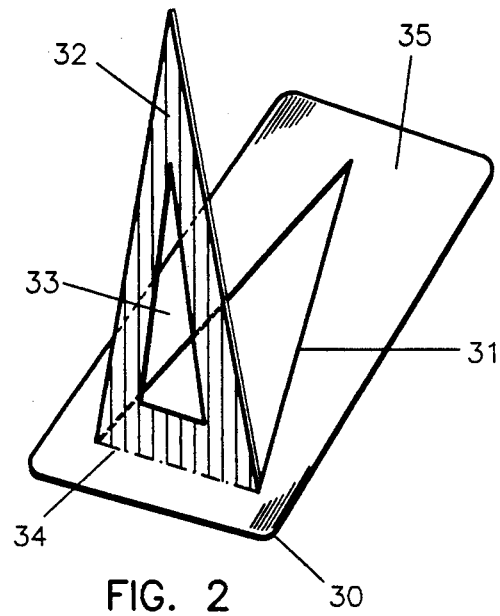
FIG. 2 is the erected view of the preferred unitary body member embodiment.

Referring now to FIGS. 1 and 2, the preferred embodiment of the invention. FIG. 1, therein is shown a flat bendable unitary sheet 30 with cut line segments 31 connecting all but the bottom side of a triangular polygon. The unitary sheet 30 is made of sheet metals, plastics, cardboard, plywood or other bendable relatively light material. The triangular polygonal member enclosed by the cut line segments 31 and the upright fold line 34 is the warning panel 32. The warning panel 32 has a luminescent or reflective surface attached thereon. A cut-out 33 is made in the above said warning panel 32. The cut-out 33 serves to reduce the air flow drag area of the erected warning panel 32. In addition, the overall flexibility of the said warning panel 32 is increased by the cut-out 33. This embodied property, allows further drag reduction as the warning panel 33 flex in the turbulent flow field. Number, size and shape of the cut-out 33 depend on the material flexibility of the unitary sheet 30 and the desired drag reduction.

FIG. 2 shows the erected embodiment of FIG. 1. The embodiment is easily assembled by folding the warning panel 32 upright along the upright fold line 34. When folded upright, the remaining unitary sheet 30 forms the base 35. The base 35 is flat, wider and longer than the warning panel 32, thus providing great static and dynamic stability. When the warning panel 32 is erected and set facing the oncoming traffic, traffic turbulence will cause the whole warning panel 32 to undulate instead of move because of the said warning panel 32 material and embodied properties. With the passing of the turbulence, the warning panel 32 will spring back erect. Horizontal and rotational movement of the signaling device are further prevented by the broad surface contact between the flat base 35 and the road. After use, the warning panel 32 is folded flat for storage.

Figure 3:
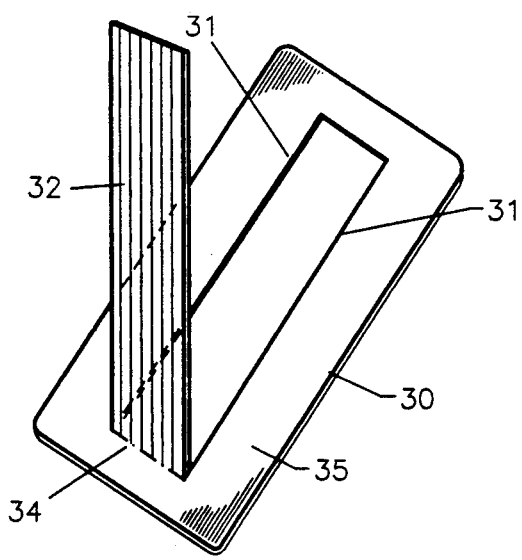
FIG. 3 is the erected view of another unitary body member embodiment.

FIG. 3 is the erected view of another embodiment of the invention comprising of a bendable, flat unitary sheet 30 with connecting cut line segments 31 and an upright fold line 34 enclosing a rectangular polygonal member. The enclosed member when bend upright along the upright fold line 34 becomes the warning panel 32. As shown in FIG. 3, the cut-out 33 in the warning panel 32 may be omitted. Warning panel 32 flexibility may be enhanced by reducing the width of the rectangular polygon. Properties and functions of the members comprising this embodiment are as said for the above preferred embodiment.

Figure 4:
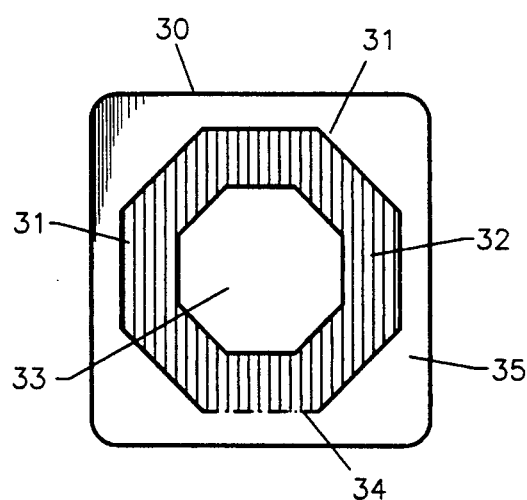
FIG. 4 is the top view of still another unitary body member embodiment.

FIG. 4 refers to the top view of a still another embodiment of the invention comprising of a bendable, flat unitary sheet 30 with cut line segments 31 and an upright fold line 34 enclosing an octagonal polygon member which serves as the warning panel 32. As shown in FIG. 4, the flexible and drag reduction properties of the warning panel 32 can be enhanced by including cut-out 33. Additional properties and functions of the members comprising this embodiment are as said for the above preferred embodiment.

Figure 5:
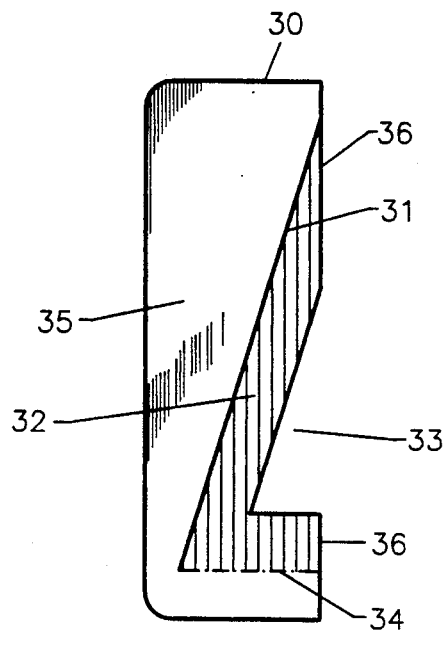
FIG. 5 is the top view of still another folded unitary body member embodiment.
Figure 6:
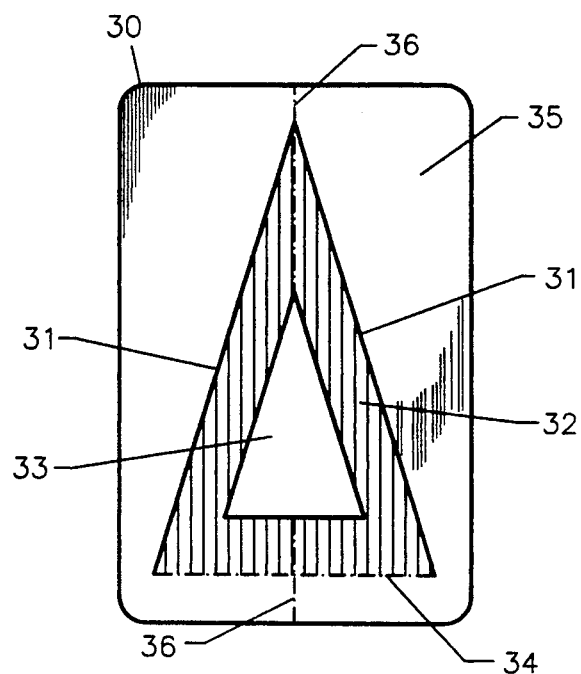
FIG. 6 is the top view of the unfolded FIG. 5 embodiment.

Referring to FIGS. 5 and 6, wherein is still another embodiment of the invention. FIG. 5 is the folded view of the embodiment. FIG. 6 is the embodiment after opening it up along the unfold line 36 whereby the flat bendable unitary sheet 30 warning device is shown. Properties and functions of the members comprising this embodiment are as said for the above preferred embodiment.

Figure 7:
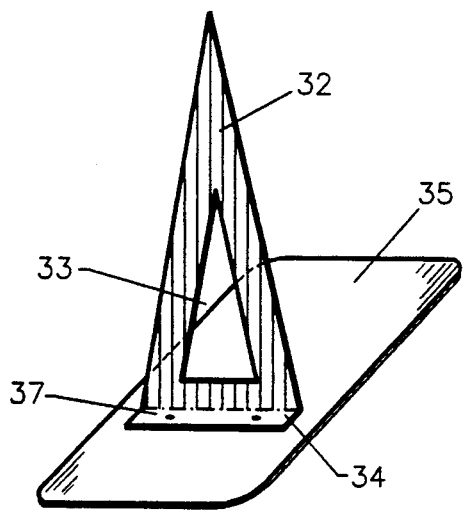
FIG. 7 is the erected view of a two member embodiment.

Now referring to FIG. 7, in which shows a two member embodiment of the invention. Therein is shown a bendable, flexible triangular polygonal warning panel 32 attached to a base 35. Attachment of warning panel 32 to the base 35 is made by fasteners 37 comprising of screws, staples, adhesives and or other couplers. The warning panel 32 is made of a bendable, flexible, relatively light material, such as sheet metals, plastics, cardboard, plywood or similar materials. The base 35 is made from the same or a relatively denser light weight material. The base 35 is flat which prevents the warning signal from flipping over by traffic turbulence. The warning panel 32 has a luminescent or reflective material on at least one surface thereof. A cut-out 33 is made in the above said warning panel 32. The cut-out 33 serves to reduce the air flow drag area of the warning panel 32. In addition, the cut-out 33 increases the overall flexibility of the said warning panel 32. This embodied property, allows further drag reduction as the warning panel 32 flex in the turbulent flow field. Number, size and shape of the cut-out 33 depend on the original material flexibility of the warning panel 32. The warning panel 32 is employed by folding along the upright fold line 34. When the warning panel 32 is erected and set facing the oncoming traffic, traffic turbulence will cause the whole warning panel 32 to undulate and not move because of the above mentioned warning panel 32 material and embodied properties. With the passing of the turbulence, the warning panel 32 will spring back erect. Horizontal and rotational movement of the signaling device are further prevented by the broad contact surface between the flat base 35 and the road. After use, the warning panel 32 is folded flat for storage.

Figure 8:
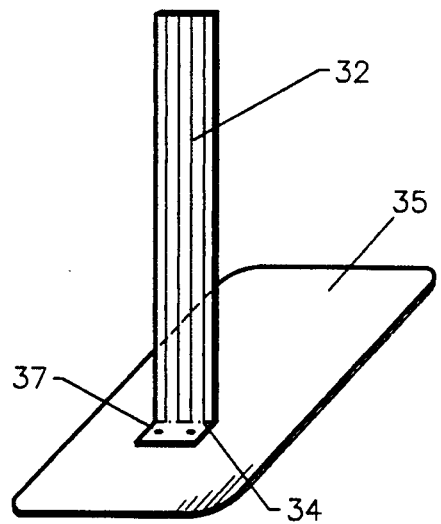
FIG. 8 is the erected view of another two member embodiment.

FIG. 8 is the top view of another two member embodiment of the invention comprising of a flexible, rectangular polygonal warning panel 32 attached to a base 35. As shown in FIG. 8, the cut-out 33 in the warning panel 32 may be omitted. Warning panel 32 flexibility may be enhanced by reducing its width. Properties and functions of the members comprising this embodiment are as said for the above two member embodiment.

Having described my invention, I claim:

1. A self-stable, light weight, foldable and easily assembled road signaling device for disabled vehicle warning or the temporary channeling of traffic comprising:
   a) a flat, unitary sheet with connecting cut line segments and an upright fold line enclosing an inner substantially large polygonal member of sufficient size to provide a visible sign;
   b) said polygonal member when bent upright along the upright fold line becomes highly visible to oncoming traffic, at least one surface of said polygonal member having one of a luminescent and reflective material thereon;
   c) said polygonal member being formed of a bendable flexible material that will permit said polygonal member to remain in an upright position when bent and allow said polygonal member to yield to wind and return to said upright position; and
   d) a remaining portion of said unitary sheet forming a stable base for supporting said polygonal member.

2. A device as set forth in claim 1 in which the said polygonal member is generally triangular in shape.

3. A device as set forth in claim 1 in which the said polygonal member is generally triangular with a cut-out.

4. A device as set in claim 1 in which the said polygonal member is generally rectangular in shape.

5. A device as set in claim 1 in which the said polygonal member is generally octagonal in shape.

6. A device as set in claim 1 in which the said polygonal member is generally octagonal in shape with a cut-out.

* * * * *